March 28, 1967 J. N. BINNS 3,311,426
RECIRCULATING BEARING ARRANGEMENT
Original Filed Nov. 12, 1959 4 Sheets-Sheet 1
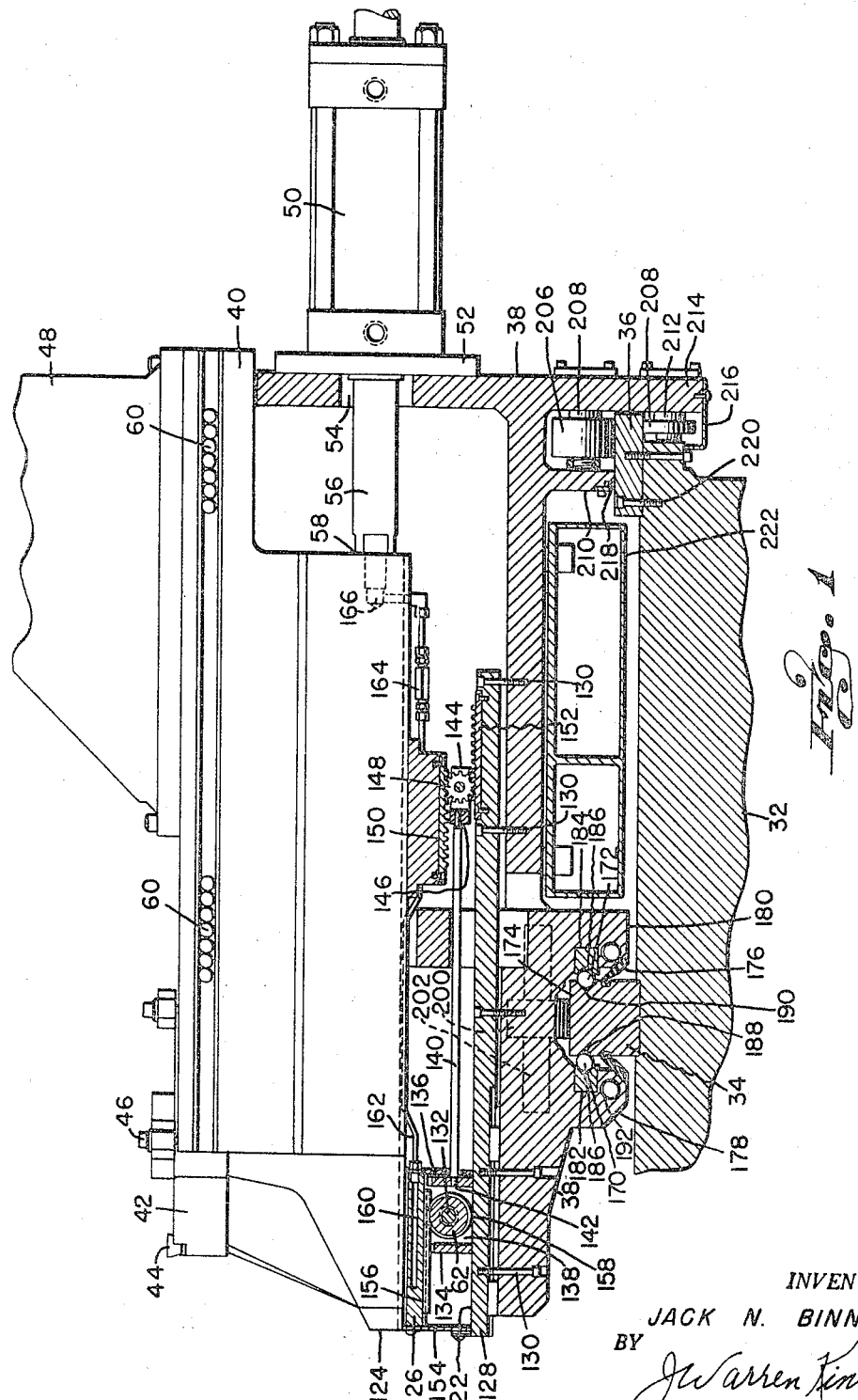
INVENTOR.
JACK N. BINNS
BY
J. Warren Kinney, Jr.
ATTORNEY

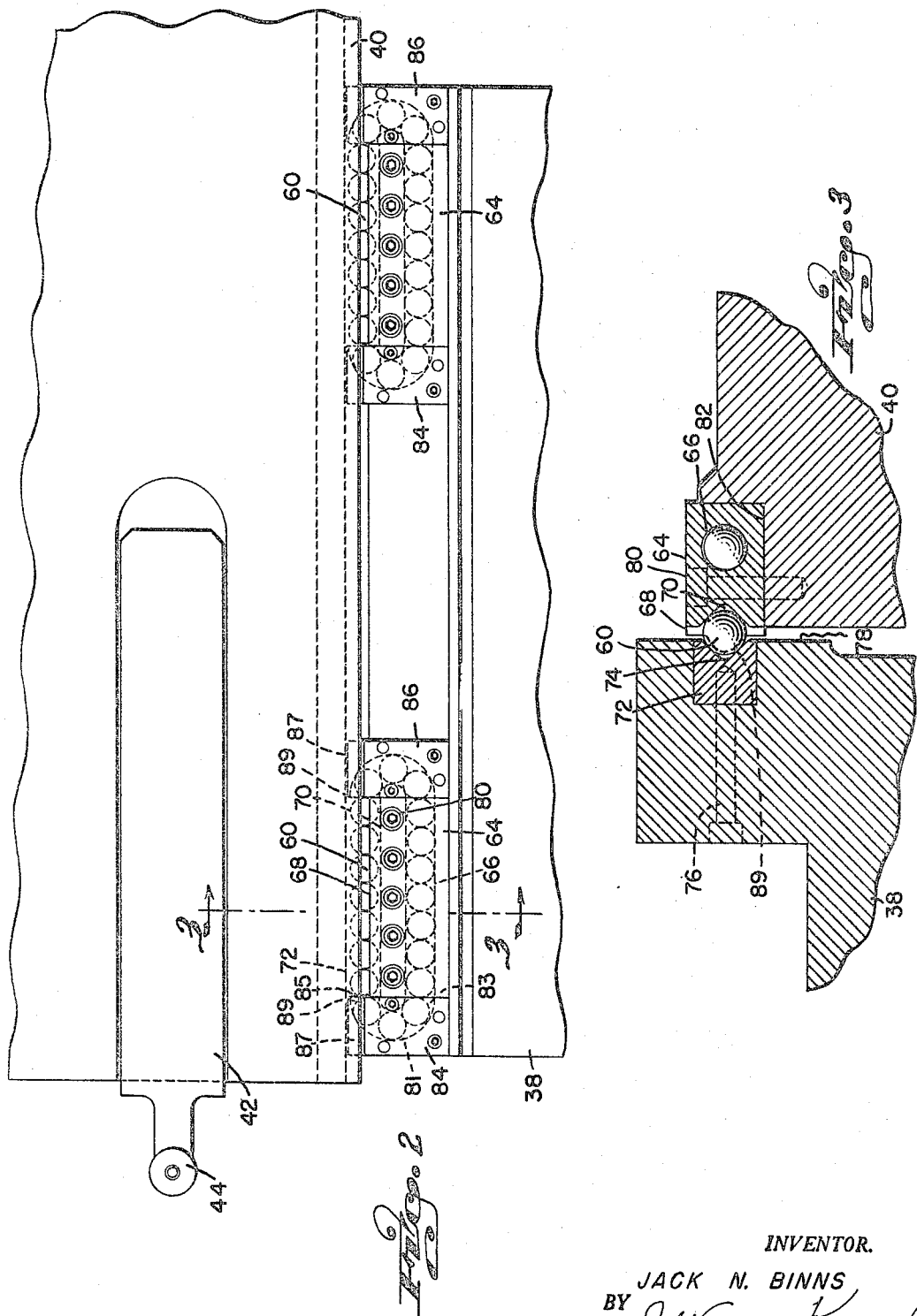

March 28, 1967  J. N. BINNS  3,311,426
RECIRCULATING BEARING ARRANGEMENT
Original Filed Nov. 12, 1959 4 Sheets-Sheet 3
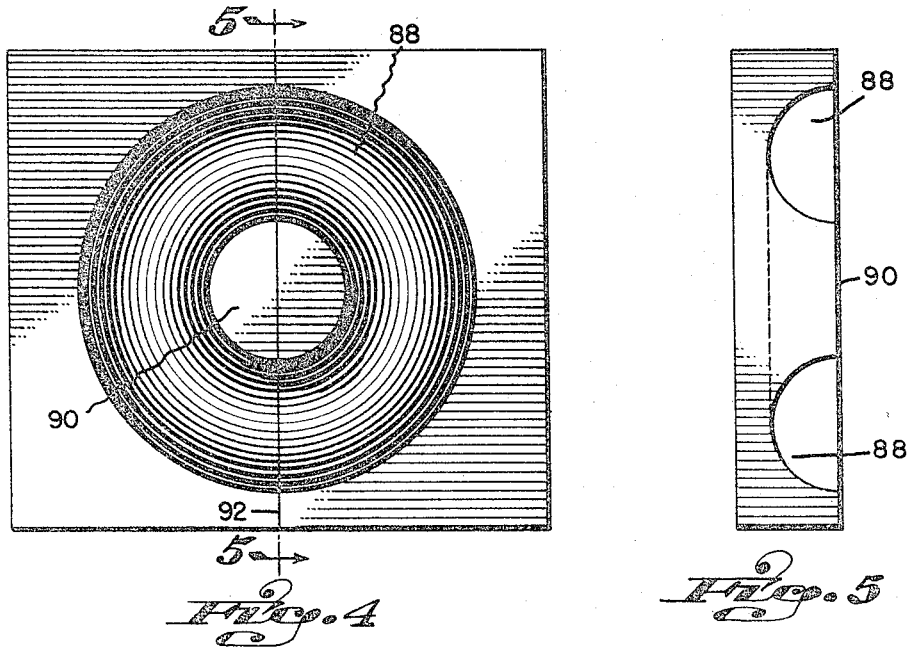
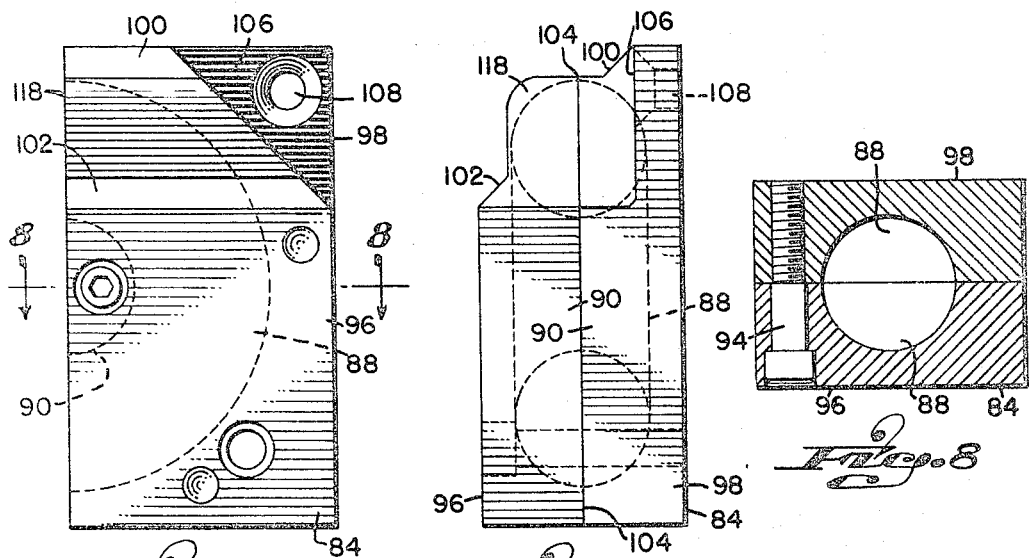
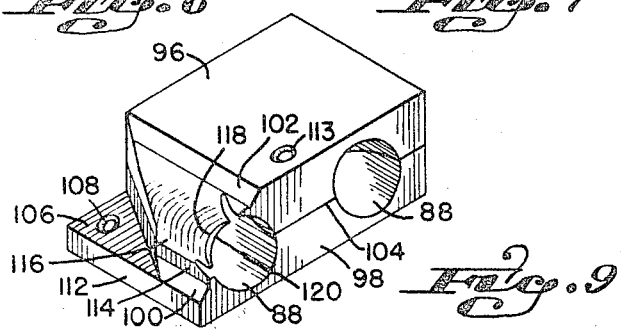
INVENTOR.
JACK N. BINNS
BY J. Warren Kinney, Jr.
ATTORNEY INVENTOR.
Jack N. Binns
BY
J. Warren Kinney Jr.
ATTORNEY

United States Patent Office 3,311,426
Patented Mar. 28, 1967

3,311,426
RECIRCULATING BEARING ARRANGEMENT
Jack N. Binns, 4866 Oaklawn Drive,
Cincinnati, Ohio 45227
Original application Nov. 12, 1959, Ser. No. 852,377, now Patent No. 3,168,846, dated Feb. 9, 1965. Divided and this application May 8, 1964, Ser. No. 374,220
4 Claims. (Cl. 308—6)

The present application is a division of application Ser. No. 852,377, filed Nov. 12, 1959, now Patent No. 3,168,846, granted Feb. 9, 1965, which is a continuation-in-part of application Ser. No. 648,396, filed Mar. 25, 1957, now Patent No. 3,022,690, granted Feb. 27, 1962.

This invention relates to a lathe, and particularly to a roll-turning lathe for the shaping of large rolls of the type used in steel mills for the rolling and shaping of metal sheets, bars, and other shapes.

An object of the invention is to provide a roll-turning lathe having improved and highly effective antifriction ball means incorporated therein, for supporting the cross-slide and saddle of the machine.

Another object is to provide novel means for constructing and assembling the improved anti-friction ball means aforesaid.

These and other objects are attained by the means described herein and disclosed in the accompanying drawings, in which:

FIG. 1 is a vertical cross-section of the saddle and cross-slide portion of the lathe disclosed in my co-pending application Ser. No. 852,377, showing on enlarged scale a modified construction incorporating certain improvements of the present invention.

FIG. 2 is a fragmentary top plan view on an enlarged scale, of the left end of the FIG. 1 illustration.

FIG. 3 is an enlarged cross-sectional view taken on line 3—3 of FIG. 2.

FIG. 4 is a plan view of a block or plate of metal partly formed to produce a pair of ball return elements for the anti-friction ball means used in supporting the cross-slide and saddle of the lathe.

FIG. 5 is an end view of one of the ball return elements, as viewed upon line 5—5 of FIG. 4.

FIG. 6 is a plan view of the ball return elements of FIG. 4 assembled, and formed to completion, to produce a complete ball return.

FIG. 7 is an end view of the FIG. 6 assembly, as viewed from right to left upon FIG. 6.

FIG. 8 is a cross-sectional view taken on line 8—8 of FIG. 6.

FIG. 9 is a perspective view of the assembly shown in FIGS. 6 and 7.

FIG. 10 is a view illustrating one end portion of the inner face of a rail guide showing in operative position two ball return elements or ball return block bodies and a raceway bar connected therebetween, adjacent parts of the structure being broken away and sectioned, the viewing plane for the assembly being designated 10—10 in FIG. 11.

FIG. 11 is a partial section taken in the plane of line 11—11 of FIG. 10 between the end of the raceway bar and an end face of the ball return block and illustrating the operative disposition of the ball scoop and the adjacent ball raceway of the bed rail.

Figure 40:
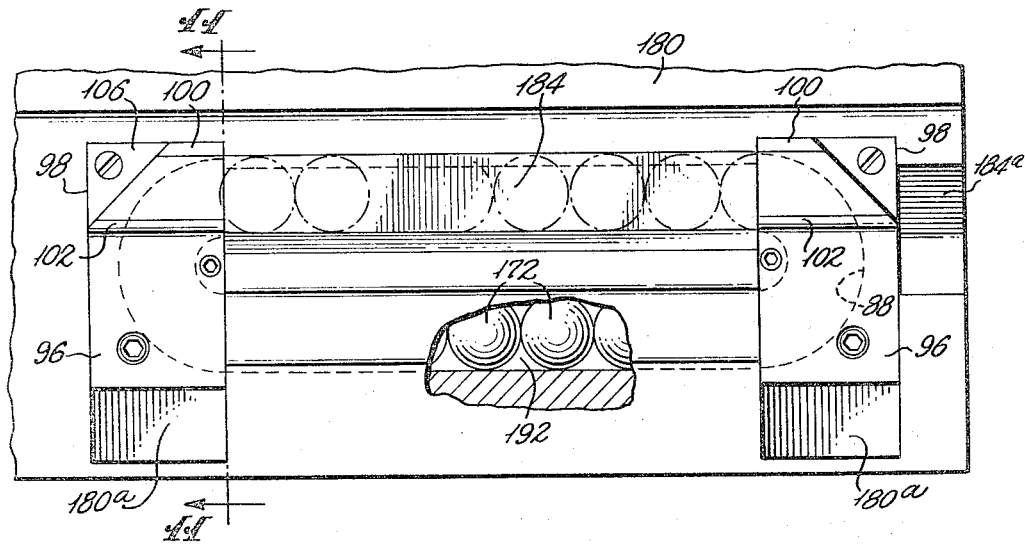
Figure 41:
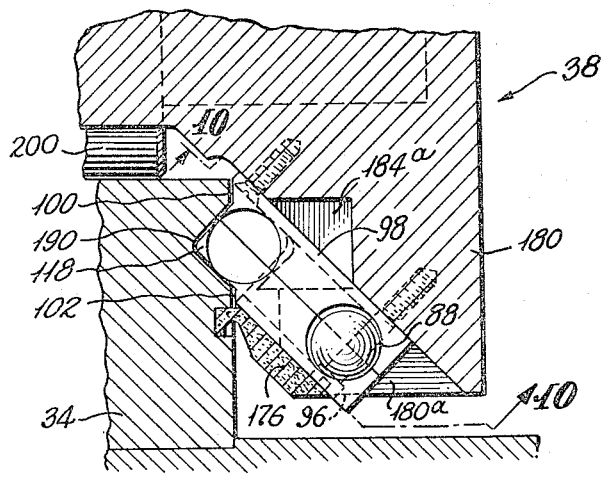

The contour roll-turning lathe in its entirety is disclosed in my copending applications aforesaid, and reference may be had thereto for any generalities of structure that may be considered helpful in correlating the elements of the present invention.

The cross-slide and saddle construction illustrated by FIG. 1, embody the modifications and improvements hereinbefore referred to. Here the lathe bed 32 carries a pair of longitudinally extending rails 34 and 36 which support the saddle or carriage 38 for shifting movement lengthwise of the lathe. The cross-slide is indicated at 40, and carries a cutting tool 42 whose cutting tip is shown at 44. Conventional means 46 may be employed to secure the tool upon the cross-slide, with the tool extending toward the workpiece. A bracket for a tracer box is indicated at 48.

For moving the cross-slide toward and from the workpiece, a double-acting hydraulic cylinder 50 may be used as the motive means, preferably under the control of a conventional tracer mechanism. The base 52 of the cylinder may be fixed to the carriage 38 about an opening 54, permitting the piston rod 56 to reach the cross-slide at 58, where it is anchored thereto. Hydraulic means may be employed also to traverse the carriage 38 along the bed rails 34 and 36 of FIG. 1 wherein 310 and 312 represent hydraulic cylinder piston rods for the purpose.

In its movements across the carriage, the cross-slide is to be supported upon anti-friction bearings including large bearing balls 60 arranged in groups or units located near the front and rear ends of the cross-slide. The bearing units are of unique construction or design, employing oversize bearing balls, and adapted to withstand the very heavy loading thereof resulting from the massive proportions of the cross-slide and the extremely heavy tool cuts attending roll-turning operations. In addition to the bearing balls 60, other supporting means for the cross-slide may be provided, in the form of an over-deflection roller 62 located beneath the tool 42, details of which will be disclosed hereinafter.

The ball units are best illustrated by FIGS. 2 and 3, wherein 64 indicates an elongate block or body of metal or other suitable material generally rectangular in form, and of a width and thickness exceeding the diameter of the bearing ball 60. From end to end the block is bored to provide a passageway 66 in which the balls may freely roll.

Along one side edge 68, the block 64 is longitudinally grooved as at 70 to provide a race in which the balls 60 may move longitudinally of the block, the race being of such dimensions as to accommodate nearly half of the ball mass. Those balls which are exposed along the outer race 70 will be confined by a secondary block 72, elongate in form, and longitudinally grooved as at 74 to provide a raceway for the exposed balls of primary block 64. The secondary block 72 may be bolted as at 76 to the cross-slide 40, and may be embedded as shown in FIG. 5, into an upright face 78 of the slide structure.

Primary block 64 is carried by the saddle 38, and may be secured thereon by means of a row of screws 80 holding the block within a longitudinal recess or shelf 82 provided on the saddle. The block 64 is so located upon the saddle as to place its raceway 70 in direct opposition to the raceway 74 of block 72, with clearance for balls 60 therebetween.

Referring now to FIG. 2, it will be understood that movement of cross-slide 40 to the left, for example, will cause all the bearing balls in contact therewith to advance toward the left, at half the speed of slide advancement. If the balls so moved are directed around the end of block 64 to enter the enclosed passageway 66, the run of balls in the enclosed passageway will be displaced in a direction opposite to that of the slide advancement, and such displaced balls are to be directed around the opposite end of block 64 to replace the balls which left the exposed or exterior raceway 70 during the cross-slide advancement.

The means provided for directing or guiding the balls around the ends of block 64 under the conditions above stated, consists of a pair of ball return end blocks or caps 84 and 86, fixed relative to the primary or intermediate block 64. Each end block or cap may be fabricated from a thick rectangular block of metal or the like, machined to provide therein a semi-circular ball way 81. One end 83 of the ball way is adapted to register with the ball way 66 of block 64, so that the balls may pass from one of the ball ways to the other.

The remaining end 85 of ball way 81 is aligned with the row of balls that ride in the cross-slide race 70, so that these balls may pass into and from the curved ball way 81. As indicated at 87, the ball return blocks extend laterally beyond the side edge 68 of block 64, to partly enter the groove 74 of secondary block 72, for intercepting and directing the balls 60 into the curved ball way 81. The extension 87 has a formed edge 89 developed into scoop shape, for so directing the balls. The scoop is indicated at 89 upon FIG. 3.

As will be understood, scoop 89 not only intercepts and guides balls 60 into the ball return end block 84, but acts also in reverse to direct balls from the end block into the raceway between the cross-slide and the saddle. Block 86 is constructed similarly to block 84, and includes a similar scoop 89.

A method of constructing the ball return end blocks will be rendered apparent in the description attending FIGS. 4 to 9, later to be treated herein.

Attention is now directed to FIG. 1, particularly with respect to the over-deflection roller 62 the purpose of which is to assume any excessive downward force imposed upon the cross-slide at its tool-bearing end, when the tool 42 is under very heavy cutting load. Normally, the sets of bearing balls 60—60 assume the weight of the cross-slide and the load imposed thereon incident to cutting action of the tool. In the event of very heavy cutting, however, it is advisable to relieve the bearing balls of part of the load in order to preclude possible damage thereto. The over-deflection roller 62 performs this function.

Roller 62 rests upon a plane surface or track 122 of a platen 128, which latter is fixed to and movable with the saddle 38, bolts or screws 130 being employed for this purpose. The cross-slide 40 carries a complementary platen 126, which is in spaced parallelism with platen 128. Between the relatively movable platens 126 and 128, the roller 62 may advance and retract with the cross-slide movements, while resting upon track 122. The roller has very close clearance with upper platen 126, so that downward deflection of the tool end of the cross-slide, occasioned by heavy loading of the tool, will promptly place the upper platen 126 in firm contact upon the top portion of the roller, thereby forcing the roller to assume part of the load that would otherwise be borne totally by the ball units 60.

From the foregoing, it will be understood that notwithstanding transfer of part of the load to the over-deflection roller 62, the ball units of the cross-slide will still function to provide frictionless support and accurate guidance of the cross-slide as it feeds the tool in and out. At the same time, the danger of scoring or otherwise injuring the bearing balls will be greatly minimized.

In order that roller 62 may perform maximal service with little attention, and infrequent replacement, it is permitted to move between the platens with great freedom. What appears to be a roller shaft at 132, is merely a guide rod passing loosely through a central enlarged opening in the roller, to prevent the roller from rubbing against the upright front and rear walls 134 and 136 of a rectangular cage 138 which moves bodily with the roller 62. The cage height is considerably less than the distance between platens 126 and 128, so that the cage may slide upon platen track 122 without contacting the upper platen 126. Guide rod 136 has its opposite ends supported by opposite side walls of the cage.

Cage 138 is subject to positive shifting in the direction of travel of roller 62, this shifting movement being effected by a tie rod 140 connected to the cage wall 136 at 142, and to a traveling pinion block 144 at 146. The pinion 148, rotatably mounted upon the block 144, is in constant mesh with a pair of opposed toothed racks 150 and 152, one of which, 150, is fixed to the cross-slide, and the other of which is fixed to the saddle through the agency of platen 128.

When the cross-slide is reciprocated transversely of the saddle 38, the racks drive the pinion and block 144 for moving the cage 138 at the speed of travel of the roller 62, which is one-half of the cross-slide speed. From the foregoing, it is understood that over-deflection roller 62 may travel practically unrestrictedly along the length of track 122 as the cross-slide is advanced and retracted, while assuming all the overload imposed by heavy tool cuts. The roller 62 is obviously well placed almost directly beneath the tool, to assume the load.

The character 154 indicates a wiper or shield depending from the snout end 124 of the cross-slide, to sweep the track 122 and prevent entry of foreign matter and dust between the platens 126 and 128. The wiper or shield moves with the cross-slide.

At 156 is indicated a depending elongate rib attached to the cross-slide platen 126, and extending in the direction of travel of roller 62. This rib rides in a circumferential center groove 158 of roller 62, to prevent lengthwise shifting of the roller against the sides of box 138.

Lubricant for the over-deflection roller 62 may be conveyed thereto from a bore 160 in platen 126, which bore communicates with the interior of box 138. An oil line 162 leads from bore 160 rearwardly to a coupling 164 and connection 166, where oil under pressure may be intermittently supplied to the oil line from a suitable source of supply.

It may here be noted that disposition of the overdeflection roller 62 and track 122 is such that these parts extend a minimal distance beyond the tool tip 44. The structure that extends beyond the tool tip is referred to as the "snout" of the cross-slide, and is indicated generally by the reference character 124. By reason of the arrangement indicated, the size and extent of the snout are reduced to a practical minimum so as to present no interference with the turning and shaping of workpieces which are quite large, or which require deep and intricate tool cuts that brings the workpiece close to the snout during the turning operation.

As was previously mentioned herien, the saddle 38 is adapted to be moved longitudinally of the lathe axis along the rails 34 and 36; cylinder power imposed by piston rods such as are indicated at 310 and 312 of FIG. 1. Anti-friction means for support of the saddle are shown upon FIG. 1, wherein 170 and 172 indicate generally the same type of ball bearing devices previously described in connection with FIGS. 2 and 3. The ball bearing means for the saddle differ from that of FIGS. 2 and 3, in that the runs of balls according to FIG. 3 are disposed in planes which, instead of being horizontal, are angularly disposed relative to the top face 174 of bed rail 34. Dust guards for the bearings are indicated at 176.

Referring to FIG. 1, the saddle includes a pair of spaced depending rail guides 178 ad 180 which overhang opposite sides of bed rail 34, and these guides carry raceway bars 182 and 184 longitudinally grooved in their upright sides to provide raceways 186 for the rows of balls 170 and 172. Complementary raceways 188 and 190 for said balls are provided in the side walls of rail 34.

The rail guides 178 and 180 are of limited length in the direction of extension of the rail 34, and each such guide is drilled longitudinally as at 192 to loosely accommodate a row of balls, in the same manner as block 64 of FIGS. 2 and 3 supports a row of balls in its passageway 66. The bores 192 are open-ended, like the bore 66 of block 64, (FIG. 2), so that the open ends thereof require the use of ball return end blocks similar to those disclosed at 84 and 86 of FIG. 2, for ensuring a continuous circulation of balls through each bore 192 and along the raceway above it, indicated at 186–188, as the saddle moves lengthwise of rail 34.

The ball return end blocks to be fixed to opposite ends of rail guides 178 and 180, for recirculating the two rows of balls associated with each rail guide, may each be fabricated in accordance with FIGS. 4 to 9. As shown in these views, the ball return end block may be fabricated from a thick rectangular block of metal or the like, FIG. 4, turned or formed to provide in one face thereof a circular half-round track or raceway 88, circumscribing a central stool 90. Prior to formation of the raceway and stool, the block is cut through along a diametral line 92 which bisects the stool and the raceway to form two identical blocks having the configuration of FIG. 5. The raceway is dimensioned to freely receive a ball such as 170, and to loosely embrace half of its area. Thus, when two such blocks are bolted together as at 94 in FIG. 8, a full ball-way is produced in which balls such as 170 may freely move while confined.

As indicated by FIGS. 6 to 9, the two block parts 96 and 98 are differently formed following the initial severance indicated upon FIG. 4, to impart certain characteristics to each. Block part 98 is milled to provide opposed flats 100 and 102 at opposite sides of a raceway 88, lying in a common plane disposed substantially at 45 degree angularity to the meeting line 104 of the block parts. The flats define a limited continuation of the ball way 186 when the ball return end block is located at one end of rail guide 178.

Block part 98 may be further milled away at one corner thereof to provide an anchoring ear 106 drilled at 108 to receive a screw or other fastener whereby the composite end block may be mounted upon the saddle, in end-closing relationship to the bore 192 of rail guide 178.

Referring to FIG. 9, it will be seen that the flat 100 is flanked by an end 112 of block part 98, and an upstanding wall 114 which intersects the adjacent raceway 88 at the parting line 104 of the block parts.

The upper block part 96, FIG. 9, between the flat 102 and the adjacent end 116 of said block, is developed to provide a thin-lipped scoop 118, the function of which is to direct individual bearing balls into the ball-way 88, from the raceway between the parts 182 and 34 of FIG. 1, as the balls move incident to shifting of the saddle as previously explained. The scoop 118, of course, operates also to direct the balls from the FIG. 9 ball return device, into the raceway between the parts 34 and 182, upon reverse shifting of the saddle. In fact, the scoop of one ball return device operates to direct bearing balls into its own ball return device, while the scoop of the other ball return device is delivering balls, to the ball raceway between the rail 34 and bar 182.

FIGS. 10 and 11 illustrate one of the anti-friction means carried by a depending rail guide 178 or 180 adjacent to one end thereof between the latter and the bed rail 34.

The anti-friction means will be described with reference to its mounting upon the rail guide 180. It will be understood, of course, that the opposite rail guide 178 will have a corresponding anti-friction means in which the ball return blocks will be disposed at the opposite inclination with respect to the adjacent vertical face of the bed rail 34.

Considering FIG. 10 there are shown the two spaced ball return blocks between which is located the raceway bar 184. In this figure the part 96 of each ball return block is seen and there is also seen the attaching ear 106 which forms an integral part of the block part 98 and by which the ball return is secured in an inclined position against the inner face of the rail guide 180.

The rail guide is recessed across its inner face as indicated at 180a to receive the ball return blocks, the open ended bore 192 extending between these recesses as shown in FIG. 10, whereby the ball return blocks are inserted into the recesses 188 in the inclined position shown in FIG. 11, the end of the half round track or raceway 88 opposite the scoop 118 will be aligned with the bore 192 as shown in FIG. 10.

In FIG. 10 the anti-friction means is viewed, in its mounting, from the plane designated 10—10 in FIG. 11. Thus the view is looking upwardly toward the inclined inner side of the guide rail 180, thereby showing some planes foreshortened.

The section of FIG. 11 taken in the plane 11—11 of FIG. 10, which passes between the end face of the return block and the end of the raceway bar 184 opposed thereto, is looking toward the end of the scoop 118 which here is shown as extending into the ball raceway 190 in the adjacent face of the bed rail 34.

The raceway bar 184 is received in the milled slot 184a in the inner face of the rail guide 180 illustrated in FIGS. 10 and 11.

The exposed or lip end of scoop 118 projects from the composite ball return device, tangentially from the mouth of the raceway 88, and in the general direction of extension of the bed rail 34. The inside surface 120 of the scoop follows and is part of the raceway 88. As will be understood, scoops such as 118 are needed only at locations where the bearing balls 170 leave and enter the raceway between the bed rail 34 and bar 182, or bar 184, that is, at opposite ends of the exposed groove 186 of bar 182, or of bar 184. Those bearing balls which are not under load imposed by the saddle thereon, travel idly through the fully enclosed passageway 192 of guide 178, or the corresponding passageway of guide 180 and similarly through the curved passageways or raceways 88 of the ball return end blocks, shown in operative position in FIG. 10.

By means of the ball return elements above described, the bearing balls of a given group or unit are recirculated within limits defined by the ball return elements, and none of the balls are capable of wandering from such confines into other areas of the continuous ball-ways between the bed rail 34 and the saddle part 178.

As will readily be appreciated, the structural features of the ball bearing units are indicative of great durability and resistance against the power of the balls, when under heavy load, to drive the ball return devices out of position relative to the opposite ends of guides 178 and 180. The bearing units as herein disclosed are required to confine and control the movements of large bearing balls, an inch or more in diameter, driven along the ball-ways under very heavy load, and therefore with almost irrestible advancement power. Scooping the balls from such ball-ways is of course an important feature of the invention.

From the foregoing, it will readily be understood that the ball return end blocks 84 and 86 of FIG. 2 can be fabricated substantially in accordance with the basic teaching of FIGS. 4 to 9, with great ease and economy. Such blocks 84 and 86 are of course simpler than those of FIG. 9, due to the fact that they need not be fitted angularly to the raceways 70 and 74, as is necessary at the guides 178 and 180 of FIG. 1. Ball return end blocks such as FIG. 9 discloses are employed at the opposite ends of each rail guide 178 and 180; that is, four such end blocks are needed for controlling the circulation of balls 170 at opposite sides of bed rail 34.

The saddle may include several pairs of rail guides such as 178 and 180 flanking the bed rail 34, and accordingly, a ball arrangement as shown may be applied to each pair in order to adequately support the saddle.

In order to relieve the balls 170 of undue wear and possible damage that might result from very heavy cutting action of tool 44, an over-deflection roller 200 may be journalled on the saddle, as by means of a shaft 202, to ride upon the top face 174 of bed rail 34. By preference, the roller 200 assumes no part of the load carried by the bearing balls 170, until the load becomes excessive. As will be understood, a plurality of over-deflection rollers such as 200 may be applied to the saddle, if desired, each adapted to take part of any overload resulting from heavy cutting action of the tool.

To preclude tilting of the saddle when tool 44 is under load, and to normally support that portion of the saddle which is remote from the tool, an outboard stabilizing means may be provided in the form of rollers 206 and 208 arranged to ride upon the upper and lower faces, respectively, of bed rail 36. Roller 206 may be carried by a short shaft 208′ having opposite ends supported horizontally by the rear wall and a depending part 210 of the saddle. The second roller 208 may be rotatably supported upon a stud 212 carried by the saddle rear wall extension 214, as shown. A dust guard and lubricant well for roller 208 is indicated at 216. Represented at 218 is a seal for retaining lubricant in which the roller 206 is packed.

Screws or equivalent fastening means 220 serve to fixedly mount the rail 36 upon the bed 32 of the machine. The character 222 indicates a fluid tank or reservoir carried by the saddle and having no pertinency to the present invention.

Structure as herein disclosed results in substantial economies of power consumption in the turning of massive workpieces, particularly as concerns tool feeding and carriage traversing. The use of bearing balls for the support of the carriage and cross-slide has been impractical heretofore, in machines designed for heavy cutting, because of the great forces and pressures transferred thereto resulting in scoring and mutilating of the balls and their raceways. With the improvements incorporated as disclosed herein, the use of very large bearing balls and proper control thereof, is made possible on a practical basis, so that excessive wear is eliminated and the shifting of heavy machine elements is facilitated and expedited, to great advantage. As concerns the disposition of bearings in the FIG. 3 modification, the resulting reduction in size and extent of the carriage snout is of great advantage for increasing the cutting capacity of the machine and eliminating much resetting of tools. Various other advantages, hereinbefore mentioned, result from the improvements disclosed.

It is to be understood that various modifications and changes in structural details of the machine may be resorted to, within the scope of the appended claims, without departing from the spirit of the invention.

What is claimed is:

1. A ball bearing structure in the form of an elongate block having a bore therethrough from end to end, and having a side face grooved to provide an exposed ball raceway coextensive with the block, the raceway and the bore being formed to accommodate rows of bearing balls movable along the raceway and through the bore, and a ball return end block fixed to each end of the elongate block, said end blocks each comprising a body having a semi-circular passageway of circular cross section for receiving balls transferred from the bore, said passageway having a ball-receptive port in registry with one end of the block bore, and a second port disposed adjacent to one end of the exposed raceway in position to receive balls from the exposed raceway and to feed balls thereto, a scoop on each end block forming an interiorly and exteriorly transversely circular part of the block extending laterally beyond the limits of the exposed raceway, for directing balls into and from said second port, the said ball return block comprising two parts, each of which said two parts contains approximately half of the curved passageway and wherein only one of said parts carries the scoop aforesaid.

2. A bearing ball return for connecting one end of a ball bearing conveyor to an adjacent end of another ball bearing conveyor along a path oblique to the horizontal, said ball return consisting of a block body having one end face for disposition in opposed operative relationship with said ends of said ball bearing conveyors and an opposite end face, said block having a semi-circular ball passage therein, having ends opening through said one face, at a spacing for alignment with said ball bearing conveyor ends, said block having a back face and a front face, the block having two relatively long narrow flat parallel faces extending from said one end face toward said opposite end face, said narrow faces being spaced apart and lying in a plane oblique to said front face of the block and cutting through a side of said ball passage at one of the ends thereof, the material of the block between said narrow faces being formed to provide a ball scoop interiorly and exteriorly transversely circular at the edge of the said one of the ends of the ball passage, and the said scoop, in the portion thereof at said edge, being offset laterally with respect to the adjacent end of the ball passage.

3. A ball bearing structure in the form of an elongate block having a bore therethrough from end to end, and having a side face grooved to provide an exposed ball raceway coextensive with the block, the raceway and the bore being forced to accommodate rows of bearing balls movable along the raceway and through the bore, and a ball return end block fixed at each end of the elongate block, said end blocks each comprising a body having a semi-circular passageway of circular cross section for receiving balls transferred from the bore, said passageway having a ball-receptive port in registry with one end of the block bore, and a second port disposed adjacent to one end of the exposed raceway in position to receive balls from the exposed raceway and to feed balls thereto, a scoop on each end block forming an interiorly and exteriorly transversely circular part of the block extending laterally beyond the limits of the exposed raceway, for directing balls into and from said second port, each ball return end block being a bi-part block wherein each part thereof contains approximately half of the curved passageway, and one only of said parts carries the scoop aforesaid.

4. A ball bearing structure for use in cooperation with a movable body and a stationary body, wherein the stationary body has a ball groove, said bearing structure embodying an elongate block having a bore longitudinally therethrough from end to end and having a side face opposing said ball groove of the stationary body, said side face having a groove of substantially V cross section providing an exposed ball raceway co-extensive with the block and disposed parallel with and in opposed operative relation to said ball groove of the stationary body, the bore and the raceway together with the said ball groove of the stationary body being adapted to accommodate a row of bearing balls movable along the raceway and through the bore, and a ball return end block fixed at each end of the elongate block, each of said end blocks comprising a body having a semi-circular bearing ball conveying passageway of circular cross-section and substantially the diameter of the conveyed bearing balls for receiving balls transferred from the bore, said semi-circular passageway lying with the center thereof in a plane oblique to said elongate block side face and passing through one side of the said V-groove therein and said plane substantially paralleling the opposite side of the V, said passageway having a circular ball receptive port in registry with one end of the block bore and a second circular port disposed adjacent to one end of said exposed raceway and having its center aligned with the approximate center of said V-groove to receive balls from the exposed raceway and feed balls thereto, and a scoop on each end block consisting of an integral part of the block and having an interiorly and an exteriorly transversely circular form, and said scoop lying to one side of said plane and extending outwardly with respect to the adjacent port beyond the limits of the exposed raceway for directing balls into and from said second port.

References Cited by the Examiner

UNITED STATES PATENTS

| | | | |
|---|---|---|---|
| 1,750,140 | 3/1930 | Thompson | 308—6 |
| 2,503,009 | 4/1950 | Thomson | 308—6 |
| 2,626,540 | 1/1953 | Eserkaln | 308—6 |
| 2,929,661 | 3/1960 | Brown | 308—6 |
| 3,008,774 | 11/1961 | Morris | 308—6 |

FOREIGN PATENTS 221,385   5/1959   Australia.

MARTIN P. SCHWADRON, *Primary Examiner.*

DAVID J. WILLIAMOWSKY, *Examiner.*

L. L. JOHNSON, *Assistant Examiner.*